United States Patent
Shimizu et al.

(10) Patent No.: US 9,535,652 B2
(45) Date of Patent: Jan. 3, 2017

(54) DISPLAY CONTROL APPARATUS WHICH CONTROLS THE BRIGHTNESS OF THE DISPLAY AND A RELATED DISPLAY CONTROL METHOD

(75) Inventors: Tsunemitsu Shimizu, Shimada (JP); Hiromi Yamazaki, Shimada (JP); Akira Masuda, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 387 days.

(21) Appl. No.: 12/729,278

(22) Filed: Mar. 23, 2010

(65) Prior Publication Data
US 2010/0245404 A1   Sep. 30, 2010

(30) Foreign Application Priority Data
Mar. 26, 2009 (JP) .................. 2009-076750

(51) Int. Cl.
G09G 3/36 (2006.01)
G06F 3/147 (2006.01)
G09G 3/34 (2006.01)

(52) U.S. Cl.
CPC ............. *G06F 3/147* (2013.01); *G09G 3/3406* (2013.01); *G09G 2320/0626* (2013.01); *G09G 2330/021* (2013.01); *G09G 2330/022* (2013.01); *G09G 2380/10* (2013.01)

(58) Field of Classification Search
CPC .............................. G09G 3/3406; G06F 3/147
USPC ....................................................... 345/102
See application file for complete search history.

(56) References Cited

U.S. PATENT DOCUMENTS

| 2002/0075136 A1* | 6/2002 | Nakaji et al. ............... 340/815.4 |
| 2003/0139862 A1* | 7/2003 | Osada ............................ 701/36 |
| 2003/0210538 A1* | 11/2003 | Tamura ........................ 362/27 |
| 2004/0002794 A1* | 1/2004 | Pillar et al. .................... 701/36 |
| 2004/0155854 A1* | 8/2004 | Ma et al. ...................... 345/102 |
| 2007/0146303 A1* | 6/2007 | Kaminosono et al. ....... 345/102 |
| 2008/0252579 A1* | 10/2008 | Kato et al. ..................... 345/87 |
| 2009/0073327 A1* | 3/2009 | Watanabe et al. ............ 348/837 |

FOREIGN PATENT DOCUMENTS

| JP | 09042043 A | * 2/1997 | ............. B60K 35/00 |
| JP | 9323567 A | 12/1997 | |
| JP | 10206195 A | 8/1998 | |
| JP | 2003137030 A | 5/2003 | |

(Continued)

OTHER PUBLICATIONS

Communication dated May 7, 2013 from the Japanese Patent Office in counterpart application No. 2009-076750.

*Primary Examiner* — Adam J Snyder
(74) *Attorney, Agent, or Firm* — Sughrue Mion, PLLC

(57) ABSTRACT

A display control apparatus includes a display control section that controls to display an image showing an operation of an equipment on a display portion provided in a vehicle and illuminate the display portion with a first brightness, and a counting section that counts a time which elapses after the equipment is activated. The display control section changes the brightness of the display portion from the first brightness to a second brightness which is lower in brightness than the first brightness in a case that an ignition switch of the vehicle is not turned on until the time counted by the counting section exceeds a predetermined period of time.

6 Claims, 5 Drawing Sheets

(56) References Cited

FOREIGN PATENT DOCUMENTS

| JP | 2003-312314 | * | 11/2003 | ............. B60K 35/00 |
| JP | 2005308895 A | | 11/2005 | |
| JP | 2007-121408 A | | 5/2007 | |
| JP | 2007210473 A | | 8/2007 | |
| JP | 2007261331 A | | 10/2007 | |
| JP | 2007276663 A | | 10/2007 | |

* cited by examiner

DISPLAY CONTROL APPARATUS WHICH CONTROLS THE BRIGHTNESS OF THE DISPLAY AND A RELATED DISPLAY CONTROL METHOD

BACKGROUND

The present invention relates to a display control apparatus and a display control method for controlling the brightnesses of a screen to be displayed on a display that is installed on a vehicle and backlight.

In general, when the driver inserts an ignition key into a key cylinder and turns it to start a vehicle, a battery switch, an accessory switch and an ignition switch become on sequentially, and with a starter motor operated an engine is activated. In vehicles equipped with an air suspension system, there are some vehicles in which the air suspension system is activated after a certain period of time has elapsed since the accessory switch is turned on. In this case, an image showing an operating state of the air suspension system is displayed on the display portion, whereby the driver is informed of the current operating state of the air suspension system.

Hereinafter, a conventional operation procedure of activating a vehicle will be described by reference to a flowchart shown in FIG. 5.

Firstly, when the driver inserts the ignition key into the key cylinder and turns the key, the battery switch is placed in an ON position, whereby a battery installed in the vehicle is connected to ECUs or various types of measuring instruments or gauges (step S101). Then, a CPU starts to operate (step S102).

The ignition key is turned to an accessory position, and it is determined that whether or not the accessory switch is turned on (step S103). If the accessory switch is not turned on (NO in step S103), the CPU is shifted to a low power consumption mode, so as to reduce the consumed power (step S104).

On the other hand, if it is determined that the accessory switch is turned on (YES in step S103), a standby mode of the CPU is canceled (step S105), whereby the operation of the air suspension system is started (step S106).

A power supply of a display is switched on (step S107), and further, the operation of the display is started, whereby a backlight of the display portion is illuminated (step S108).

It is determined that whether or not the ignition switch is turned on (step S109), and if it is determined that the ignition switch is not turned on, the flow of the operation procedure is returned to the operation in step S108.

On the other hand, if the ignition switch is determined to have been put on, an operation or operations relevant to the ignition switch being on are executed (step S110), and further, the vehicle starts to operate normally (step S111).

Here, as described above, since the air suspension system is activated after the accessory switch is turned on, in a case that the ignition switch is still not turned on even after a long period of time has elapsed since the air suspension system started to operate, with the engine started to operate, an operating state of the air suspension system is kept displayed on the display. As this occurs, the consumed power by the display portion which keeps displaying the operation state of the air suspension system is increased, which causes a problem that large load of the battery occurs.

In addition, JP-A-2007-121408 (Patent Document 1) describes a liquid crystal display apparatus which realizes a backlight which can save electric power to be consumed. However, nothing is described therein on means or method for reducing the consumed power before the ignition switch is turned on.

[Patent Document 1] JP-A-2007-121408

As described above, with the conventional display control apparatus, there exists the drawback that when displaying on the display an image such as one showing the operating state of the air suspension system before the ignition switch is turned on to start the engine, large electric power is required and large load of the battery occurs. Thus, there have been increasing demands on reduction of the consumed power by displaying the image before the ignition switch is turned on.

SUMMARY

The invention has been made with a view to solving the conventional problem, and an object thereof is to provide a display control apparatus and a display control method for reducing consumed power due to a displaying of the image before an ignition switch is turned on.

In order to achieve the above object, according to the present invention, there is provided a display control apparatus, comprising:

a display control section that controls to display an image showing an operation of an equipment on a display portion provided in a vehicle and illuminate the display portion with a first brightness; and a counting section that counts a time which elapses after the equipment is activated, wherein the display control section changes the brightness of the display portion from the first brightness to a second brightness which is lower in brightness than the first brightness in a case that an ignition switch of the vehicle is not turned on until the time counted by the counting section exceeds a predetermined period of time.

Preferably, the display control section decreases the brightness of the display portion step by step as time elapses after the equipment is activated.

Preferably, the display control section returns the brightness of the display portion to the first brightness from the second brightness in a case that the ignition switch is turned on after the brightness of the display portion is changed to the second brightness.

Preferably, the display control apparatus further includes an input section that receives an input operation. The display control section returns the brightness of the display portion to the first brightness from the second brightness in a case that the input section receives the input operation after the brightness of the display is changed to the second brightness.

Preferably, the operation of the equipment is either an operation of an air suspension system or an operation of a pump system of a fire truck.

Here, it is preferable that, an display control method, comprising:

displaying an image showing an operation of an equipment on a display portion provided in a vehicle and illuminating the display portion with a first brightness; and changing the brightness of the display portion from the first brightness to a second brightness which is lower in brightness than the first brightness in a case that an ignition switch of the vehicle is not turned on until a time which elapses after the equipment is activated exceeds a predetermined period of time.

According to the above configurations, when the equipment such as the air suspension system is activated to operate, the image showing the operation of the equipment is displayed on the display portion. Further, when the predetermined period of time elapses in a state that the ignition switch is not turned on, the brightness of the display portion is changed to the second brightness from the first brightness. Consequently, the consumed power in a sate that the engine is not in operation can be reduced, thereby making it possible to reduce the load of the battery.

According to the above configuration, when the equipment is activated to operate, the brightness of the display portion is decreased step by step as the time elapses after the equipment is activated. Namely, the brightness of the display portion is controlled to decrease lower as the elapsing time get longer. Consequently, the brightness of the display portion decreases lower as the interest in the display portion displaying the image showing the operation of the equipment gets lower, thereby making it possible to reduce the consumed power.

According to the above configuration, when the ignition switch is turned on after the brightness of the display portion is changed to the second brightness, the brightness of the display portion is returned to the first brightness from the second brightness. Therefore, the visibility of the display portion can be increased after the engine has been started to thereby reduce the unfavorable influence to the battery.

According to the above configuration, when the operation section is operated after the brightness of the display portion is changed to the second brightness, the brightness of the display portion is returned to the first brightness. Because of this, the visibility of the display portion can be increased by the operation of the operation section by a user of the vehicle.

According to the above configuration, the operating state of the air suspension system or the pump system of the fire truck can be visualized, and the consumed power when the operating state is displayed on the display portion can be reduced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Figure 1:
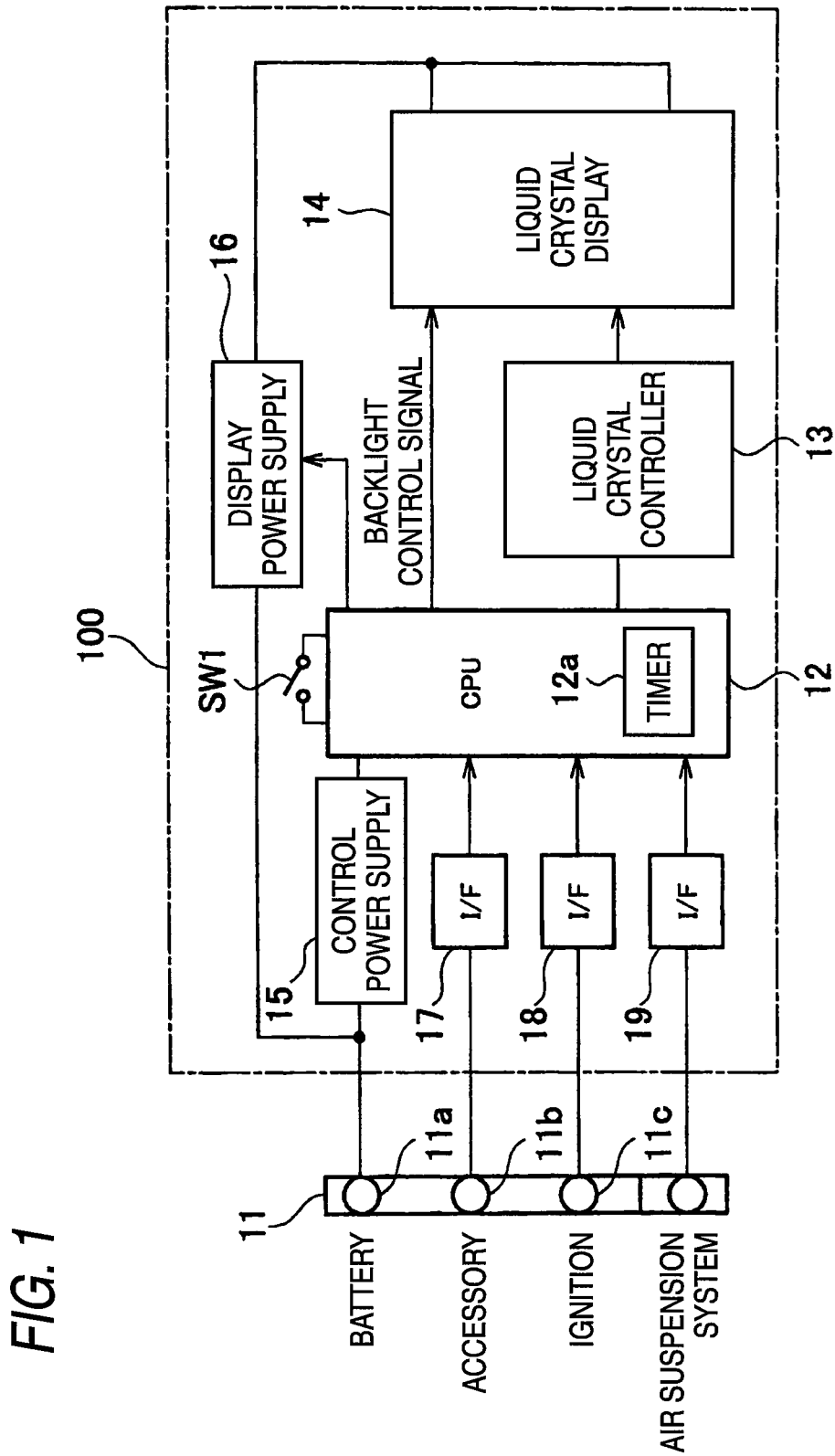
FIG. 1 is a block diagram showing the configuration of a display control apparatus according to an embodiment of the invention.

Hereinafter, an embodiment of the invention will be described based on the drawings. FIG. 1 is a block diagram showing the configuration of a display control apparatus 100 according to an embodiment of the invention including peripheral equipment. As is shown in FIG. 1, a key switch is connected to the display control apparatus 100. An operation signal of an air suspension system (predetermined equipment) installed on a vehicle is inputted into the display control apparatus 100.

The key switch 11 includes a battery switch 11a, an accessory switch 11b and an ignition switch 11c. The respective switches 11a, 11b, 11c can be put on sequentially by inserting a key into a key cylinder to turn it accordingly.

The display control apparatus 100 includes a CPU (a display control section) 12 for governing an overall control, a liquid crystal controller 13, a liquid crystal display 14, a control power supply 15, a display power supply 16 and three interfaces 17, 18, 19.

The liquid crystal display 14 has a backlight portion, and displays various types of pieces of information on the running of the vehicle. A driving state of the air suspension system installed on the vehicle is displayed on the liquid crystal display 14.

The liquid crystal controller 13 stores various types of image data and performs operations to display an image on the liquid crystal display 14.

The CPU 12 functions as a center of control of the display control apparatus 100. In the embodiment, the CPU 12 controls the brightness of the backlight portion of the liquid crystal display 14. Specifically, the CPU 12 can set the brightness of the backlight portion to a normal brightness and a low brightness. The backlight portion is illuminated with a normal brightness condition in the normal brightness. The low brightness is lower in brightness than the normal brightness. The brightness of the backlight 13 is changed by a method described later. In a modified example, the brightness of the backlight portion is set to three types of brightnesses including the normal brightness, a primary low brightness which is lower than the normal brightness and a secondary low brightness which is lower than the primary low brightness.

Further, the CPU 12 has a timer 12a in an interior thereof and counts a time that elapses after an initiation of drive of the air suspension system as will be described later. The CPU 12 also includes an operation switch (an input section) SW1 for receiving an input by the operator. As will be described later, the operation switch SW1 is a switch for returning the brightness of the liquid crystal display 14 to the normal brightness from the low brightness when the brightness of the liquid crystal display 14 is in the low brightness.

The control power supply 15 generates a stable voltage of 5 V, for example, based on electric power supplied by a battery as an input and supplies this voltage to the CPU 12 as a driving power.

The display power supply 16 generates a stable voltage for driving the liquid crystal display 14 based on electric power supplied from the battery as an input.

The interface 17 is provided to input a signal indicating a state of the accessory switch into the CPU 12. The interface 18 is provided to input a signal indicating a state of the ignition switch into the CPU 12. The interface 19 is provided to input a state of the air suspension system into the CPU 12.

Figure 2:
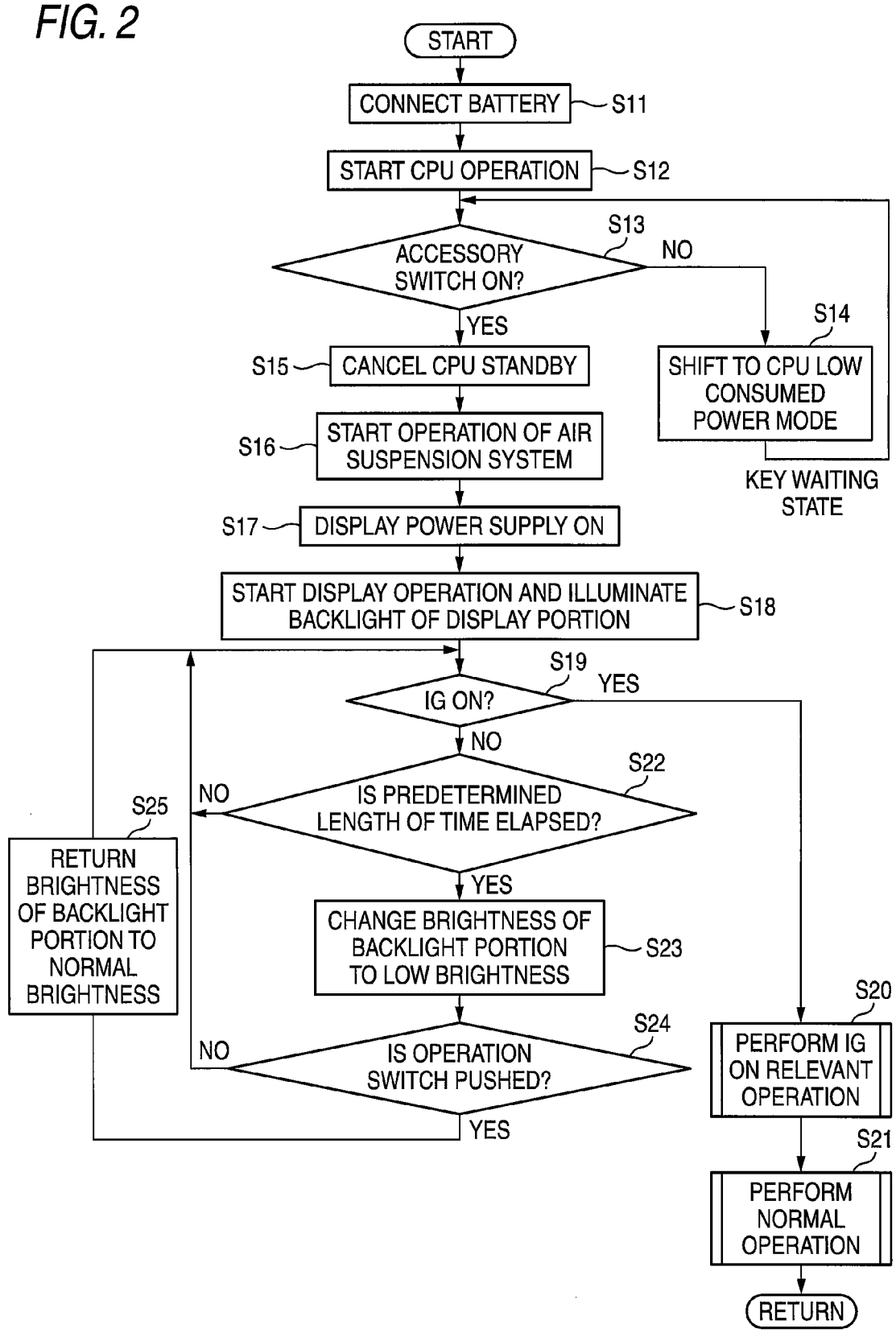
FIG. 2 is a flowchart showing an operation procedure of the display control apparatus according to the embodiment of the invention.

Next, the operation of the display control apparatus 100 according to the embodiment will be described by reference to a flowchart shown in FIG. 2 and a timing chart shown in FIG. 3.

Figure 3:
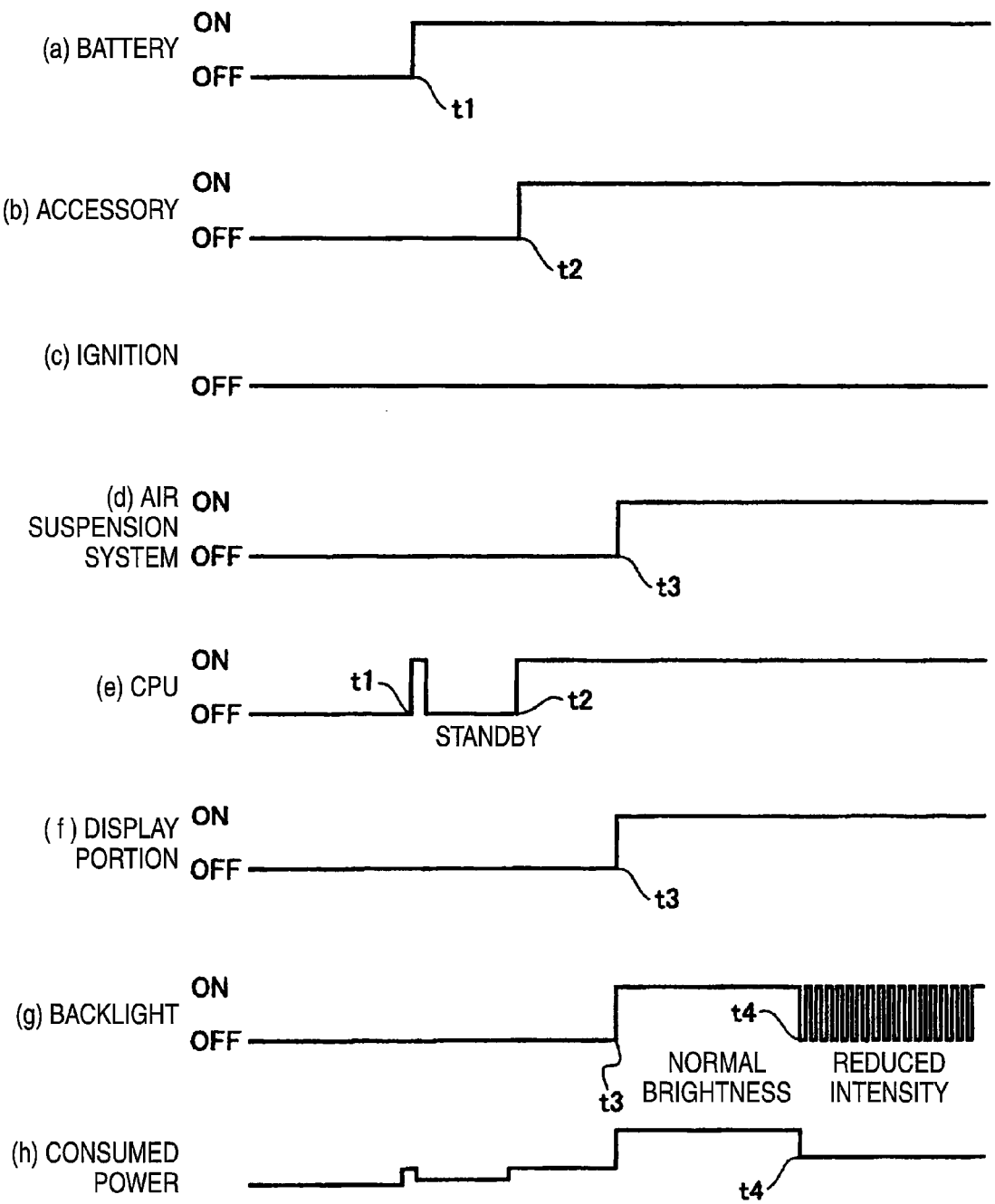
FIG. 3 is a timing chart showing changes in various types of signals in the display control apparatus according to the embodiment of the invention.

Firstly, when the driver inserts the key into the key cylinder to turn the key, the battery switch is put on (at a time t1 at (a) and (e) in FIG. 3), whereby the battery is connected to respective ECUs or various types of measuring instruments or gauges in the vehicle (step S11). Then, the CPU 12 starts to operate (step S12).

Then, the key is turned to the accessory position, and it is determined that whether or not the accessory switch is turned on (step S13). If it is determined that the accessory switch is not turned on (NO in step S13), the CPU 12 is shifted to a low consumed power mode, so as to reduce consumed power (step S14).

On the other hand, if it is determined that the accessory switch is turned on (at a time t2 in FIG. 3), a standby mode is cancelled (step S15), whereby the operation of the air suspension system is started after a predetermined period of time has elapsed (step S16, at a time g t3 at (d) in FIG. 3).

At the same time as the start of the air suspension system, the power source of the display is turned on (step S17), and further, the operation of the display is started (at a time t3 at (d) in FIG. 3), whereby the backlight portion of the display is illuminated (step S18, at a time t3 at (g) in FIG. 3). Further, the timer 12a starts the counting at the time t3.

Next, it is determined that whether or not the ignition switch is turned on (step S19). If it is determined that the ignition switch is turned on (YES in step S19), operations relevant to the ignition switch being on are executed (step S20), and further, the vehicle starts to operate normally (step S21).

On the other hand, if it is determined that the ignition switch is not turned on (NO in step S19), the CPU 12 determines whether or not the time counted by the timer 12a has reached a predetermined period of time (step S22).

If it is determined that the predetermined period of time has not been reached (NO in step S22), the brightness of the backlight portion of the liquid crystal display 14 is changed to the low brightness from the normal brightness (step S23, a time t4 at (g) in FIG. 3). Namely, electric power to be supplied to the backlight portion is decreased by PWM controlling. Therefore, a voltage to be supplied to the backlight portion is decreased, and also the consumed power of the backlight portion is decreased.

Thereafter, it is determined that whether or not the operation switch SW1 is operated (step S24). If it is determined that the operation switch SW1 is not operated (NO in step S24), the flow of the operation procedure is returned to the operation in step S19.

On the other hand, if it is determined that the operation switch SW1 is operated (YES in step S24), the brightness of the backlight of the liquid crystal display 14 is returned to the normal brightness from the low brightness (step S25). Then, the flow of the operation procedure is returned to the operation in step S19.

In a case that the ignition switch is not turned on after the operation of the air suspension system is activated, the brightness of the backlight portion of the liquid crystal display 14 is changed to the low brightness from the normal brightness, whereby the consumed power can be reduced. As a result, as is shown at (h) in FIG. 3, consumed current at the time t4 and later can be reduced, and hence, the consumed power can be reduced.

In the display control apparatus 100 according to the embodiment, when the accessory switch is turned on and thereafter the backlight portion of the liquid crystal display 14 is illuminated so as to start a displaying of the operation of the air suspension system, in a case that the ignition switch is not turned on by the time when the predetermined period of time elapses, the brightness of the backlight portion is changed to the low brightness from the normal brightness. Consequently, the consumed power of the battery can be reduced, whereby load of the battery when the engine is not in operation can be reduced.

In a case that the ignition switch is turned on to start the engine when the backlight portion is in the low brightness, since the brightness of the backlight portion is returned to the initial brightness (the normal brightness) from the low brightness, the visibility of the display indicating the operating state of the air suspension system can be increased.

Further, in a case that the user of the vehicle operates the operation switch when the brightness of the backlight is in the low brightness, since the brightness of the backlight is returned to the initial brightness (the normal brightness) from the low brightness, the user can return the brightness of the backlight portion to the normal brightness by own operation of the operation switch, thereby making it possible to improve the operability and visibility of the display control apparatus 100.

In the embodiment, the display control apparatus 100 is described as the air suspension as the equipment, the invention is not limited thereto but can be applied to any equipment that is activated to operate after the accessory switch is turned on. For example, the invention can be applied to a configuration in which the operating state of a pump of a fire truck is displayed on the liquid crystal display 14.

Figure 4:
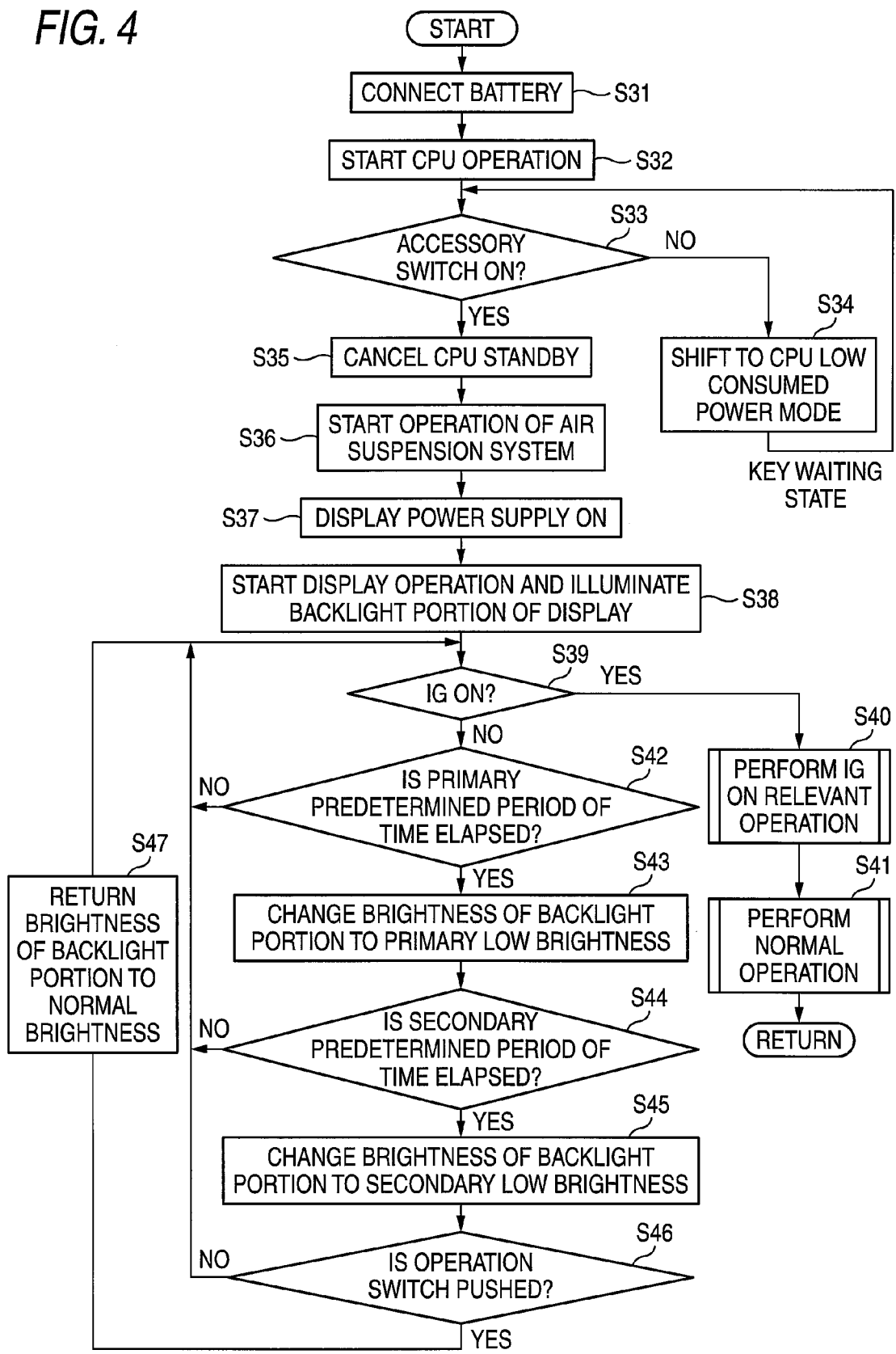
FIG. 4 is a flowchart showing an operation procedure of a display control apparatus according to a modified example of the invention.
Figure 5:
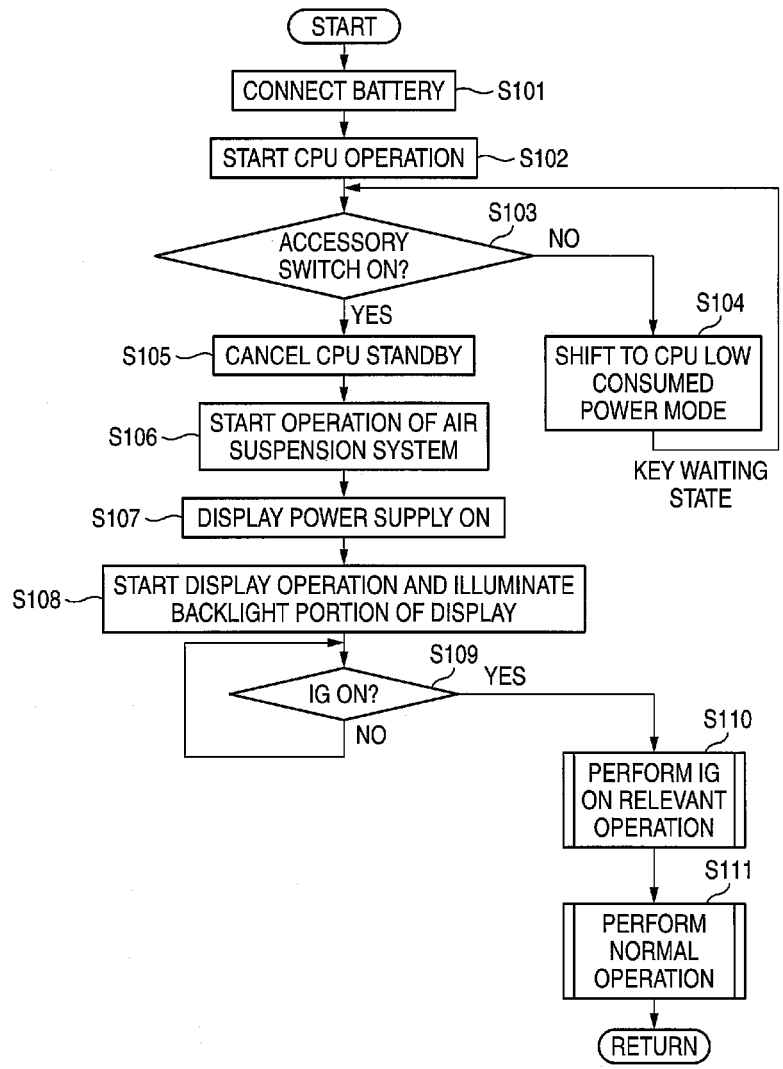
FIG. 5 is a flowchart showing an operation procedure of a conventional display control apparatus.

Next, a modified example to the embodiment will be described. FIG. 4 is a flowchart illustrating operations of a display control apparatus according to the modified example. In the embodiment, the voltage to be supplied to the backlight portion of the liquid crystal display 14 is PWM controlled to change the brightness of the backlight to the low brightness from the normal brightness in a case that the predetermined period of time elapses after the air suspension system is activated to operate and the operation of the air suspension system is displayed. In the modified example, however, the brightness is reduced step by step in accordance with a time that is elapsed since the operation of the air suspension system is displayed.

Hereinafter, the modified example will be described in detail by reference to a flowchart shown in FIG. 4. Operations in steps S31 to S38 shown in FIG. 4 are the same as the operations of the steps S11 to S18 shown in FIG. 2, and therefore, the description thereof will be omitted herein.

In step S39 shown in FIG. 4, it is determined that whether or not an ignition switch of a vehicle is turned on. Then, if it is determined that the ignition switch is turned on (YES in step S39), operations relevant to the turn-on operation of the ignition switch are executed (step S40), and further, the vehicle starts to operate normally (step S41).

On the other hand, if it is determined that the ignition switch is not turned on (NO in step S39), a CPU 12 determines whether or not a time counted by a timer 12a reaches a primary predetermined period of time (step S42).

If it is determined that the primary predetermined period of time is not reached (NO in step S42), the flow of the operation procedure returns to the operation in step S39. On the other hand, if it is determined that the primary predetermined period of time is reached (YES in step S42), the brightness of the backlight portion of the liquid crystal display 14 is changed to a primary low brightness (step S43). Namely, if it is determined that the primary predetermined period of time elapsed, electric power to be supplied to the backlight is controlled by PWM controlling. Therefore, a voltage to be supplied to the backlight is reduced, whereby the brightness of the backlight is changed to the primary low brightness to decrease the consumed power.

Thereafter, the CPU 12 determines whether or not the time counted by the timer 12a reaches a secondary predetermined period of time which is longer than the primary predetermined period of time (step S44).

If it is determined that the secondary predetermined period of time is not reached (NO in step S44), the flow of the operation procedure returns to the operation in step S39. On the other hand, if it is determined that the secondary predetermined period of time is reached (YES in step S44), the brightness of the liquid crystal display 14 is changed to a secondary low brightness which is lower than the primary low brightness (step S45). Namely, if it is determined that the secondary predetermined period of time elapses, the electric power to be supplied to the backlight is controlled by PWM controlling. The voltage to be supplied to the backlight is decreased, and the brightness of the backlight portion is changed to the secondary low brightness so as to decrease the consumed power.

Thereafter, it is determined that whether or not an operation switch SW1 is operated (step S46). If it is determined that the operation switch is not operated (NO in step S46), the flow of the operation procedure returns to the operation in step S39.

On the other hand, if it is determined that the operation switch SW1 is operated (YES in step S46), the brightness of the backlight portion of the liquid crystal display 14 is returned to the normal brightness (step S47), and thereafter, the flow of the operation procedure returns to the operation in step S39.

In this way, in the display control apparatus 100 according to the modified example, the brightness of the backlight portion is changed to the primary low brightness in a case that the ignition switch is not turned on by the time the primary predetermined period of time elapses after the accessory switch is turned on and thereafter the backlight portion of the liquid crystal display 14 is illuminated to display the operation of the air suspension system.

Further, if the ignition switch is not turned on by the time the secondary predetermined period of time elapses, the brightness of the backlight portion 14 is changed to the secondary low brightness which is lower in brightness than the primary brightness. Namely, the brightness of the backlight is reduced step by step as time elapses. Consequently, the consumed power of the battery can decreased step by step, and load of the battery when the engine is not in operation can be reduced.

In a case that the ignition switch is activated to operate when the backlight is in the primary low brightness or the secondary low brightness, since the brightness of the backlight is returned to the original brightness (the normal brightness), the visibility of display of the operation of the air suspension system can be increased.

Further, in a case that the user of the vehicle operates the operation switch when the brightness of the backlight is in the primary low brightness or the secondary low brightness, since the brightness of the backlight portion is returned to the original brightness (the normal brightness), the user can returns the brightness of the backlight portion to the normal brightness by itself being operated, thereby making it possible to increase the operability and visibility of the display control apparatus 100.

In the modified example, while the brightness of the backlight portion is described as being changed to the two low brightness states, a configuration can also be adopted in which the brightness of the backlight portion is reduced in three or more stages.

Thus, although the display control apparatus and display control method of the invention have been described based on the embodiment shown in the figures, the invention is not limited thereto, and hence, the configurations of the respect constituent members can be replaced by arbitrary configurations having like functions can be adopted.

For example, in the embodiment and the modified example, while the air suspension system has been described as the predetermined equipment, the invention can also be applied to the operation of other instruments than that described herein.

The invention is extremely useful in reducing consumed power when an operating state of the air suspension system is displayed.

The present application is based on Japanese Patent Application No. 2009-076750 filed on Mar. 26, 2009, the contents of which are incorporated herein for reference.

What is claimed is:

1. A display control apparatus, comprising:
a display control section that controls to display an image showing an operation of an equipment on a display portion provided in a vehicle and illuminate the display portion with a first brightness, the equipment being mounted on the vehicle; and
a counting section that counts a time which elapses after the equipment is activated,
wherein the display control section controls to display the image showing the operation of the equipment on the display while illuminating the display portion with the first brightness when the equipment is activated after an accessory switch of the vehicle is turned on; and
wherein the display control section changes the brightness of the display portion from the first brightness to a second brightness which is lower in brightness than the first brightness when an ignition switch of the vehicle is not turned on within a predetermined time period elapsed from the time counted by the counting section, wherein the display portion is at least partially illuminated but the image showing the operation of the equipment is still visible when at said second brightness.

2. The display control apparatus according to claim 1, wherein the display control section decreases the brightness of the display portion step by step as time elapses after the equipment is activated.

3. The display control apparatus according to claim 1, wherein the display control section returns the brightness of the display portion to the first brightness from the second brightness in a case that the ignition switch is turned on after the brightness of the display portion is changed to the second brightness.

4. The display control apparatus according to claim 1, further comprising:
an input section that receives an input operation,
wherein the display control section returns the brightness of the display portion to the first brightness from the second brightness in a case that the input section receives the input operation after the brightness of the display is changed to the second brightness.

5. The display control apparatus according to claim 1, wherein the operation of the equipment is either an operation of an air suspension system or an operation of a pump system of a fire truck.

6. A display control method, comprising:
displaying an image showing an operation of an equipment on a display portion provided in a vehicle and illuminating the display portion with a first brightness, the equipment being mounted on the vehicle;
counting a time which elapses after the equipment is activated;

displaying the image showing the operation of the equipment on the display while illuminating the display portion with the first brightness when the equipment is activated after an accessory switch of the vehicle is turned on; and changing the brightness of the display portion from the first brightness to a second brightness which is lower in brightness than the first brightness when an ignition switch of the vehicle is not turned on within a predetermined time period elapsed from the time counted by the counting process, wherein the display portion is at least partially illuminated but the image showing the operation of the equipment is still visible when at said second brightness.

* * * * *